United States Patent [19]

Müller

[11] Patent Number: 4,829,148
[45] Date of Patent: May 9, 1989

[54] ELECTRIC POSITION INDICATING APPARATUS

[76] Inventor: Fritz Müller, Neur Wasen 6, Ingelfingen-Criesbach, Fed. Rep. of Germany, 7118

[21] Appl. No.: 170,148
[22] Filed: Mar. 18, 1988

[30] Foreign Application Priority Data

Apr. 1, 1987 [DE] Fed. Rep. of Germany ....... 3710987

[51] Int. Cl.4 ............................................... H01H 9/00
[52] U.S. Cl. .................................... 200/56 R; 200/47; 200/293
[58] Field of Search ................. 361/179; 200/38 E, 47, 200/56 R, 61.13, 61.18, 153 LA, 293, 30 R

[56] References Cited

U.S. PATENT DOCUMENTS

| | | | |
|---|---|---|---|
| 2,639,337 | 5/1953 | Framhein | 200/153 LA X |
| 3,472,977 | 10/1969 | Ziegler, Jr. | 200/47 |
| 3,703,616 | 11/1972 | Martin | 200/56 R |
| 3,937,912 | 2/1976 | Martin | 200/56 R X |
| 4,247,744 | 1/1981 | Birkle | 200/47 |
| 4,672,230 | 6/1987 | Spahn | 361/179 |

Primary Examiner—J. R. Scott
Attorney, Agent, or Firm—Henry M. Feiereisen

[57] ABSTRACT

An electric position indicating apparatus includes a base structure which accommodates a central reciprocating element is provided with a control mechanism for determining the position of the reciprocating element. Connected to the base structure is a component carrier the walls of which support the control mechanism with its control elements, clamp terminals and circuit boards. The walls of the component carrier are directed toward the corners of the base structure with the control elements supported at one side of the base structure and the clamp terminals at the opposing side thereof.

19 Claims, 5 Drawing Sheets

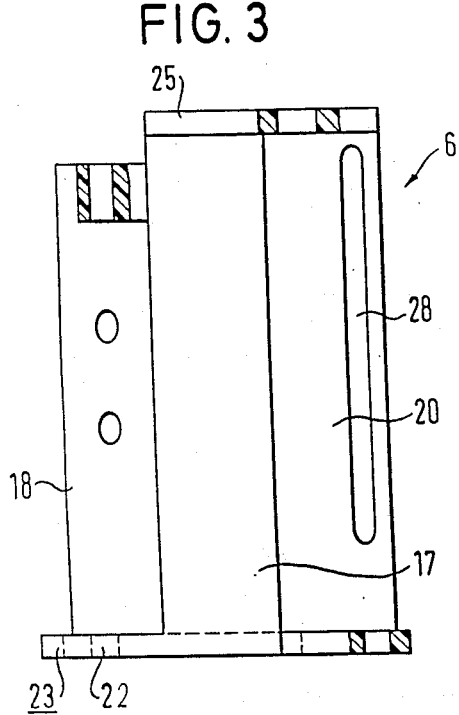
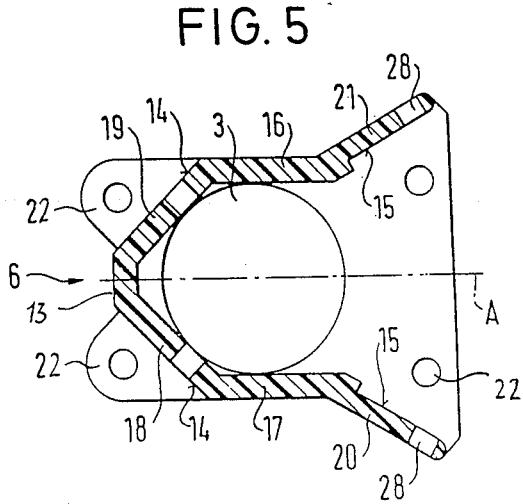
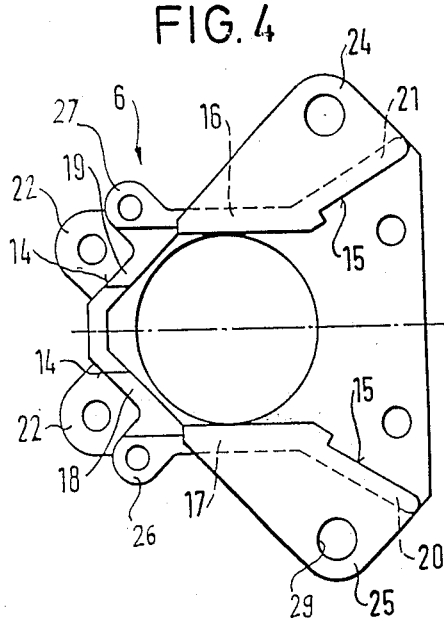

ELECTRIC POSITION INDICATING APPARATUS

BACKGROUND OF THE INVENTION

The present invention is concerned with an electric position indicating apparatus, and in particular to an electric position indicating apparatus which includes a base structure which accommodates a central reciprocating element and houses the control mechanism for determining the position of the reciprocating element.

An electric position indicating apparatus of this kind requires considerable space and has great dimensions in comparison to the devices with which they cooperate so that an undesirable overall bulky unit is obtained.

SUMMARY OF THE INVENTION

It is thus an object of the present invention to provide an improved electric position indicating apparatus obviating the afore-stated drawbacks.

The object and others which will become apparent hereinafter are attained in accordance with the present invention by mounting to the base structure a component carrier which supports the control mechanism provided with control elements, clamp terminals and circuit boards and cooperating with the reciprocating element.

Through the provision of a component carrier for supporting all the mechanical and electrical components or structural parts of the electric position indicating apparatus, the spacial demand for such a unit is considerably reduced and yet the unit is still accurate and reliable in operation. The available space is utilized in an optimum manner by preferably arranging the relevant components at the carrier in a star-like fashion. The component carrier can be combined with the attached components to a pre-assembled unit and thus mounted to the base structure in one single working step by means of suitable screws.

In order to attain an especially compact unit, the base structure is of tetragonal shape, preferably of square shape.

The component carrier may include walls which support the components and extend toward the corners of the tetragonal base structure. Thus, the walls extend in a star-like arrangement whereby the space between the diagonal of the tetragon is usable in an optimum manner for housing the components. The components of the control mechanism may be mounted to the base structure such that the control elements are disposed at one side of the base structure while the clamp terminals e.g. terminal strips or the like are arranged at the opposing side thereof. Thus, the control elements which cooperate with the reciprocating element may be combined at one side of the component carrier while the connections for the electric position indicating apparatus may be combined at the other side.

According to a further feature of the present invention, the walls supporting the control elements diverge relative to the center of the base structure in direction toward the corners so that through the thus obtained V-shaped arrangement of these walls the control elements are directed toward the reciprocating element. An arrangement of the control elements in this manner allows an especially accurate and reliable cooperation with the reciprocating element.

According to yet another feature of the invention, the walls supporting the clamp terminals converge relative to the center of the base structure in direction toward the corners and preferably define an angle of about 90° with the apex facing one of the sides of the tetragonal basic structure. The clamp terminals are thus easily accessible while still retaining the compact overall unit.

Preferably, the component carrier may be symmetrically designed with the plane of symmetry extending through the center of the base structure so that an inexpensive production thereof can be achieved.

In order to provide the component carrier with a sufficient stiffness and yet with relatively small demand on space, the component carrier preferably surrounds the reciprocating element and may include two opposing parallel sections tangentially extending to the reciprocating element and connected at their one ends to converging sections thus defining a tilted V-shaped arrangement for providing the walls for the clamp terminals. The other ends of the parallel sections may be connected to diverging sections which provide the walls for supporting the control elements.

Advantageously, the circuit boards for connecting the electric components are mounted to the component carrier approximately perpendicular to the walls supporting the control elements and clamp terminals so as to extend parallel to the base area of the base structure. By attaching the circuit boards in such a manner that the walls which support the clamp terminals and oppose each other are covered by the circuit boards, the latter are arranged in vicinity of the clamp terminals so that the electric connections can be kept to short lengths.

The control elements for determining the position of the reciprocating elements may be represented by roller switches with rollers running on the surface of the reciprocating element, or they may be made in form of electric proximity switches which cooperate with the reciprocating element in contactless manner. Such proximity switches include rather bulky amplifiers for the signals which in view of the dimension thereof are difficult to be housed near the proximity switch. Thus, according to another feature of the invention, the amplifier is integrated at a distance to the proximity switch within the respective connecting cable so as to be positionable in a suitably available space e.g. close to the corners or between the walls of the component carrier extending in star-like manner.

A protection of the electric position indicating apparatus is accomplished by surrounding the component carrier with the attached components of the control mechanism by a cup-shaped casing which is fixed to the base structure and may also be of a tetragonal shape. Preferably, the casing is transparent and may be made of plastic material so that the operation can be monitored.

BRIEF DESCRIPTION OF THE DRAWING

The above and other objects, features and advantages of the present invention will now be described in more detail with reference to the accompanying drawing in which:

FIG. 3 is a side view of the electric position indicating apparatus of FIG. 1 illustrating a component carrier without the components being attached;

FIG. 4 is a top view of the component carrier according to FIG. 3;

FIG. 5 is a cross sectional view of the component carrier;

DETAILED DESCRIPTION OF PREFERRED EMBODIMENTS

Figure 1:
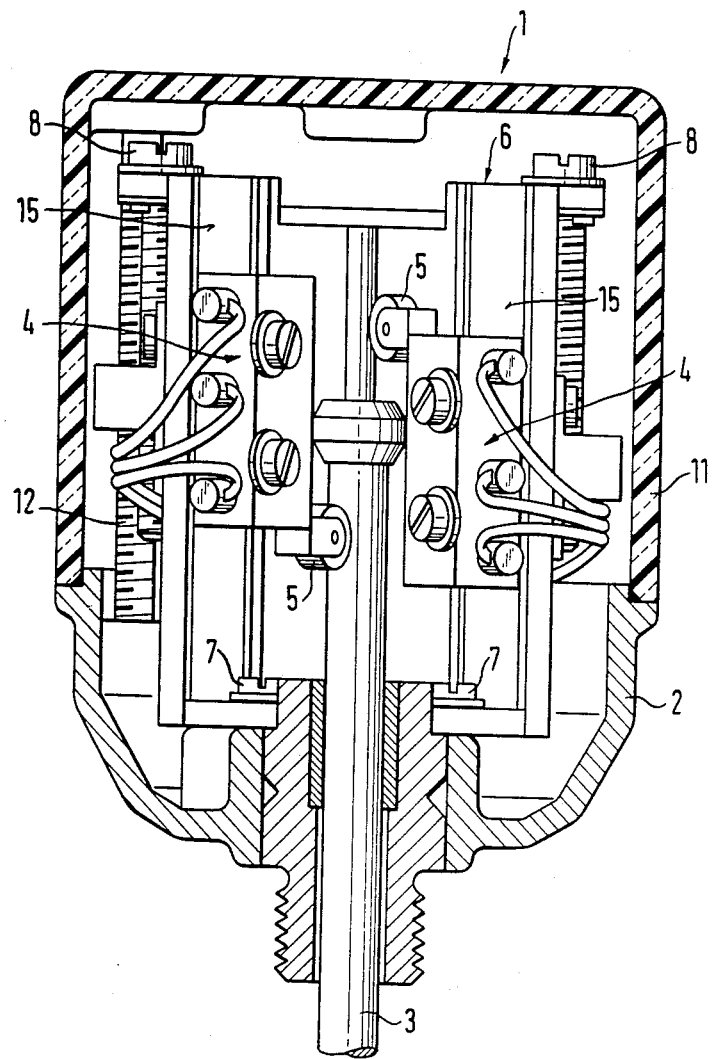
FIG. 1 is a partial side cross sectional view of one embodiment of an electric position indicating apparatus according to the invention.

Referring firstly to FIGS. 1 to 5 and in particular to FIG. 1, there is shown a first embodiment of an electric position indicating apparatus according to the invention generally designated by reference numeral 1 and including a base structure 2 of tetragonal base, preferably square base. Extending centrally within the base structure 2 is a reciprocating member 3 the position of which is to be determined. The reciprocating element 3 is designed like a piston rod and is suitably guided at the bottom of the base structure 2. Cooperating with the reciprocating element 3 are control elements generally designated by reference numeral 4 and provided in form of roller switches in the embodiment of the electric position indicating apparatus 1 of FIG. 1. As can be seen from FIG. 1, two roller switches 4 are arranged each of which including a roller 5 running on the surface of the reciprocating element 3.

Mounted to the base structure 2 via e.g. suitable screws 7 and 8 is a carrier generally designated by reference numeral 6 for supporting components or structural parts of the electric position indicating apparatus 1. As will be described in more detail with reference to FIGS. 3 to 5, the component carrier 6 supports the control unit including control elements 4 like roller switches, clamp terminals 9 in form of e.g. terminal strips, and circuit boards 10 one of which is e.g. shown in FIG. 2. The circuit boards 10 contain the circuitry of the electric position indicating apparatus 1 and are connected to the component carrier 6 via suitable lines or cables. The components of the circuit boards 10 are not shown in detail because they vary from application to application and structural parts are connected to each other in a generally known manner.

Figure 2:
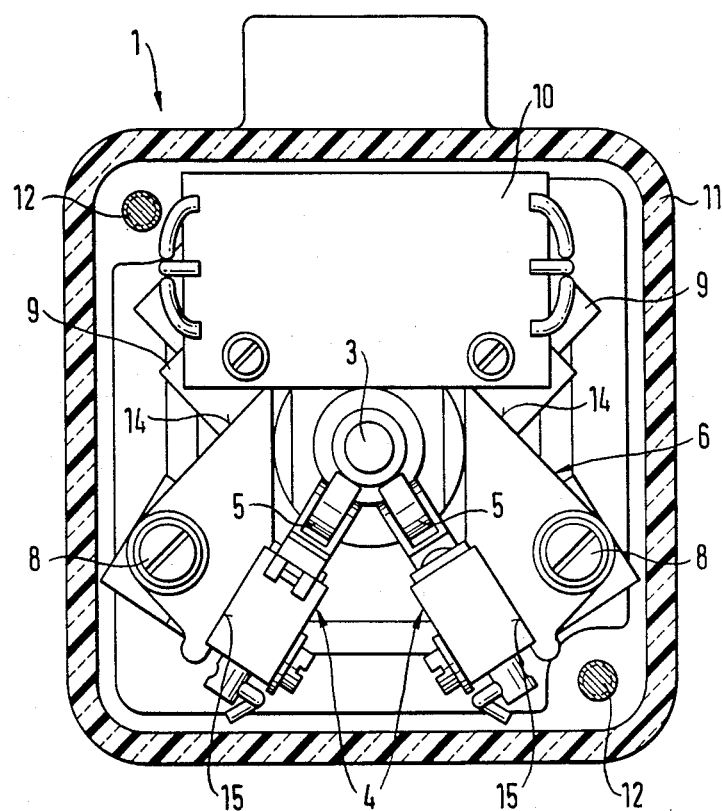
FIG. 2 is a top view of the electric position indicating apparatus of FIG. 1.

Turning now in particular to FIG. 2, there is shown a top view of the electric position indicating apparatus 1, and it can be seen that the component carrier 6 is provided with walls 14, 15 which support the respective components and extend in such a manner that they are directed towards the corners of the tetragonal base of the base structure 2 to give the component carrier 6 an approximately star-shaped design. Surrounding the base structure 2 and the component carrier 6 is a cup-shaped casing 11 which is suitably made of transparent plastic material and is fixedly connected to the base structure 2 e.g. by two diagonally opposing screws 12. The cup-shaped casing 11 has about the same base area as the base structure 2 and thus has also a tetragonal cross section.

As will be readily recognized from FIG. 2, the control elements 4 are combined and arranged on one side of the tetragonal base structure 2 i.e. in FIG. 2 at the lower side thereof, while the clamp terminals 9 are positioned opposite thereto and thus at the opposing side of the tetragonal base structure 2. The control board 10 is arranged approximately parallel to the base area of the base structure 2 and extends over the area of the clamp terminals 9 and the walls 14 of the component carrier 6. As will be described furtherbelow, the walls 14 support the clamp terminals 9 while the control elements 4 are mounted to the walls 15 of the component carrier 6.

Referring now to FIGS. 3 to 5, and in particular to FIG. 5 there is shown a nonlimiting example of one embodiment of the component carrier 6 in accordance with the present invention. As illustrated in the cross sectional view of FIG. 5, the component carrier 6 surrounds the reciprocating element 3 indicated by a circle and is made preferably in one piece of a suitable plastic material so that only a few structural parts need to be connected for making the electric position indicating apparatus.

The component carrier 6 includes two approximately parallel sections 16, 17 which extend opposite to each other tangentially to the base circle of the reciprocating element 3. Connecting the one ends of the sections 16, 17 are two converging sections 18, 19 which are thus of V-shaped arrangement with flattened apex and define an apex 13 angle of about 90°. The converging sections 18, 19 define the support walls 14 for the clamp terminals 9.

The other opposing ends of the substantially parallel sections 16, 17 are connected to two diverging sections 20, 21 which extend in a direction toward the corners of the base structure 2 and define the support walls 15 for attachment of the control elements 4.

Each of the converging sections 18, 19 and the diverging sections 20, 21 includes through-openings or elongated slots 28 for allowing attachment of the respective components. In the nonlimiting example of FIG. 3, the diverging sections 20, 21 are each provided with an elongated slot 28 via which the control elements 4 can be mounted thereto in a vertically adjustable manner so that the position of the reciprocating element 3 can be determined in a reliable fashion.

The component carrier 6 is further provided with a foot portion or base 23 which includes four bores 22 arranged to each other in a tetragon and provided for attachment of the component carrier 6 to the base structure 2 of the electric position indicating apparatus via the respective screws 7 as shown in FIG. 1.

At its upper part, the component carrier 6 is provided with winglike prolongations 24, 25 which are connected to the parallel sections 16, 17 and the diverging sections 20, 21 and includes through-holes 29 for attachment of the component carrier 6 to the base structure 2 via the screws 8 (see FIGS. 1 and 2). The component carrier 6 is further provided at its upper part with projections 26, 27 which are connected at the junction of the parallel sections 16, 17 to the converging sections 18, 19 and allow the attachment and support of the circuit board 10 as shown e.g. in FIG. 2 via suitable through-holes. The circuit board 10 thus extends at the top side of the component carrier 6 over the converging sections 18, 19 and is arranged vertical to the walls 14, 15 so that the upper area of the component carrier 6 can be utilized in an optimum manner.

As can be seen from FIGS. 4 and 5, the component carrier 6 defines in cross section a plane of symmetry designated by A and extending through the center of the reciprocating element 3 and base structure 2.

Figure 6:
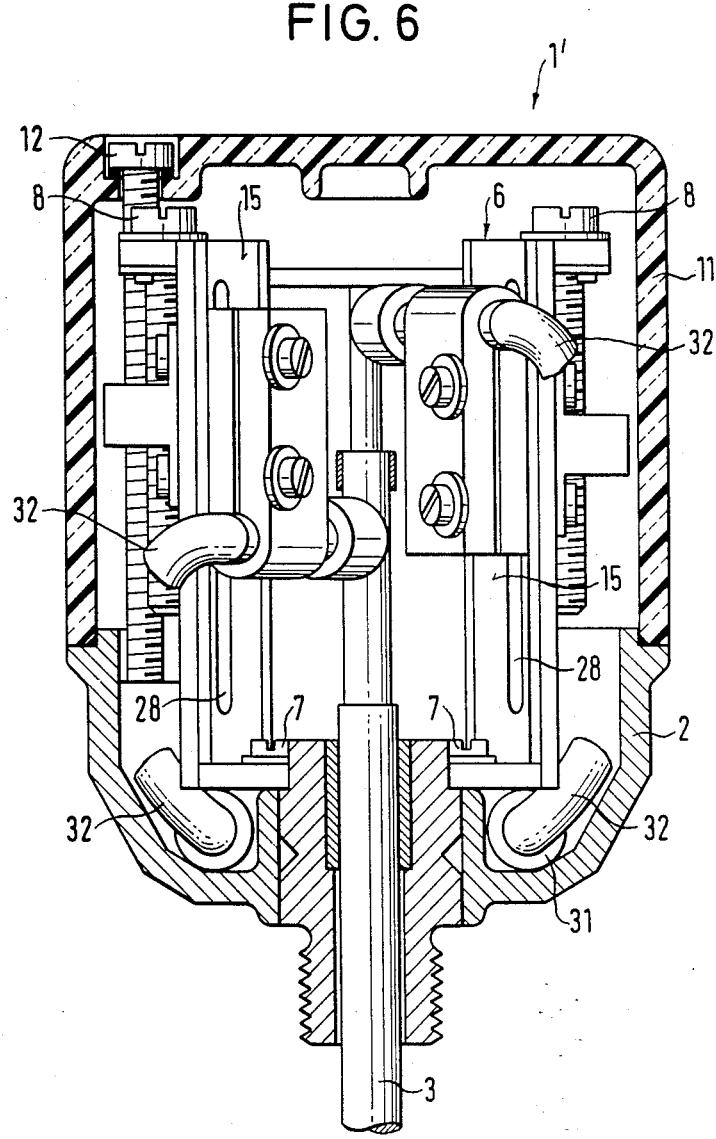
FIG. 6 is a partial side cross sectional view of another embodiment of an electric position indicating apparatus according to the invention.
Figure 7:
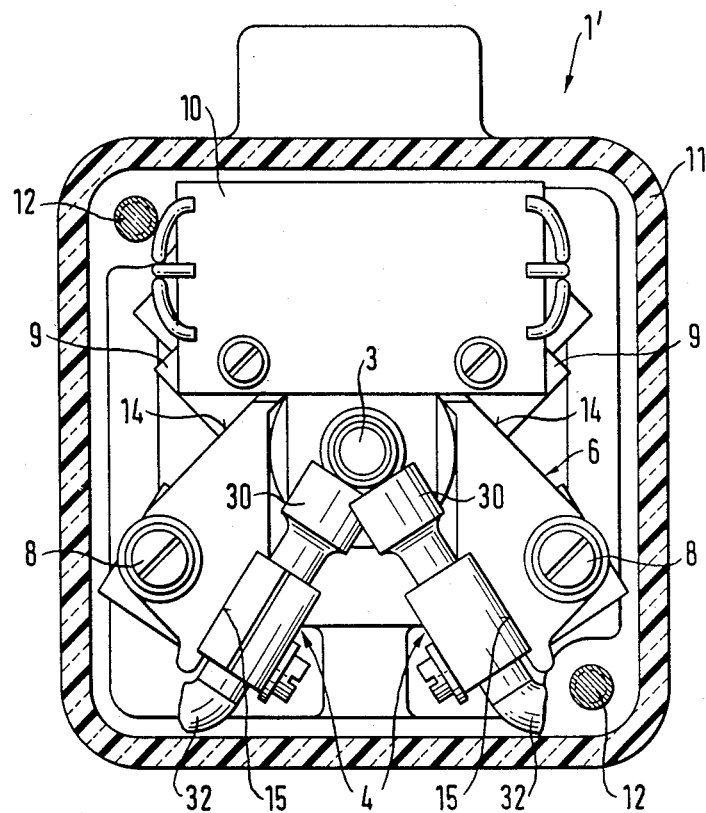
FIG. 7 a top view of the electric position indicating apparatus of FIG. 6.

Turning now to FIGS. 6 and 7, there is shown a further embodiment of an electric position indicating apparatus in accordance with the invention and designated by reference numeral 1'. In the nonlimiting example of FIGS. 6 and 7, same reference numerals have been used for corresponding parts as in FIGS. 1 and 2. The electric position indicating apparatus 1' includes in essentially similar manner as the position indicating apparatus 1, the base structure 2, the reciprocating element 3 and the component carrier 6 so that a detailed description of these parts is not necessary.

In contrast to the previously described embodiment as shown in FIG. 1, the electric position indicating apparatus 1' includes control elements 4 in form of proximity switches for cooperation with the reciprocating element 3. Like the roller switches of the previous embodiment, these proximity switches 30 are mounted to the walls 15 which are defined by the diverging sections 20, 21 of the component carrier 6. The proximity switches 30 are provided with proximity initiators and with an amplifier 31 for boosting signals. The amplifier 31 is integrated in a section of a connecting cable 32 at a distance from the associated proximity switch 30. The relatively bulky amplifier 31 is thus arranged within the space surrounded by the cup-shaped casing 11 at a distance to the attachment area of the proximity switch 30 to the wall 15. For example, the amplifier 31 may be located in both lower corner areas of the base structure 2 to utilize this otherwise lost space in efficient manner.

It is certainly conceivable to make modifications within the scope of the present invention in the embodiments described only by way of example. Although the base structure 2 and/or the cup-shaped casing 11 are described as having tetragonal base area, it is possible to provide these elements also of any other suitable cross section as e.g. oval-shaped, a combination of oval-shaped and polygonal, or circular, or any combination thereof. In addition, control elements other than those described may be used depending on the respective case of application. Likewise, the clamp terminals 9 may be substituted by other suitable structural elements.

While the invention has been illustrated and described as embodied in an Electric Position Indicating Apparatus, it is not intended to be limited to the details shown since various modifications and structural changes may be made without departing in any way from the spirit of the present invention.

What is claimed as new and desired to be protected by Letters Patent is set forth in the appended claims:

1. Electric position indicating apparatus for a reciprocating element; comprising:
   a base structure accommodating the reciprocating element;
   electric control means including a plurality of components operatively connected with the reciprocating element for determining the position thereof; and
   carrier means connected to said base structure for supporting said control means, said carrier means including a component carrier essentially surrounding the reciprocating element and being sectionized to define walls which support all components of said control means in an arrangement about the reciprocating element.

2. Apparatus as defined in claim 1 wherein said base structure has an essentially tetragonal shape.

3. Apparatus as defined in claim 2 wherein said walls surround the reciprocating element in such a manner that they point in direction toward corners of said tetragonal base structure.

4. Apparatus as defined in claim 2 wherein the reciprocating element extends centrally in said base structure, said control means including control elements cooperating with the reciprocating element and being connected to said component carrier at one side of the reciprocating element, and clamp terminals provided for electric connection and being attached to said component carrier at the other side of the reciprocating element opposite to said control elements.

5. Apparatus as defined in claim 4 wherein said control elements are supported by such walls of said component carrier which diverge relative to the center of said base structure toward the corners of said base structure.

6. Apparatus as defined in claim 4 wherein said clamp terminals are supported by such walls of said component carrier which converge relative to the center of said base structure.

7. Apparatus as defined in claim 1 wherein said component carrier defines a plane of symmetry extending through the center of said base structure to thereby give said component carrier a symmetric structure for facilitating making thereof.

8. Apparatus as defined in claim 1 wherein said component carrier includes two opposing parallel sections extending tangentially to the reciprocating element, a V-shaped section connected to one end of said parallel sections, and two diverging sections respectively connected to the other end of said parallel sections.

9. Apparatus as defined in claim 8 wherein said V-shaped section of said component carrier defines walls for allowing attachment of said clamp terminals, and said diverging sections defines walls for allowing attachment of said control elements.

10. Apparatus as defined in claim 9 wherein said control means further includes control boards attached to said component carrier and extending approximately perpendicular to said walls which support said clamp terminals and said control elements.

11. Apparatus as defined in claim 10 wherein said control boards extend over said walls defined by said V-shaped section.

12. Apparatus as defined in claim 1 wherein said component carrier is made in one piece.

13. Apparatus as defined in claim 12 wherein said component carrier is made of plastic material.

14. Apparatus as defined in claim 1 wherein said control means includes control elements in form of roller switches with rolls running along the surface of the reciprocating element.

15. Apparatus as defined in claim 1 wherein said control means includes control elements in form of proximity switches which provide an electric signal in dependence on the position of the reciprocating element.

16. Apparatus as defined in claim 15 wherein said proximity switches include an amplifier for amplifying the electric signal, said amplifier being integrated within a connecting cable at a distance to said proximity switches.

17. Apparatus as defined in claim 1, and further comprising a cup-shaped casing fixed to said base structure and surrounding said carrier means with said electric control means mounted thereto, said casing being of tetragonal shape in correspondence to said base structure.

18. Apparatus as defined in claim 17 wherein said casing is transparent.

19. Apparatus as defined in claim 17 wherein said casing is made of plastic material.

* * * * *